United States Patent
Shin et al.

(10) Patent No.: US 9,288,087 B2
(45) Date of Patent: Mar. 15, 2016

(54) DATA RECEIVER CIRCUIT AND METHOD OF ADAPTIVELY CONTROLLING EQUALIZATION COEFFICIENTS USING THE SAME

(71) Applicant: Samsung Electronics Co., Ltd., Suwon-si (KR)

(72) Inventors: Won-Hwa Shin, Suwon-si (KR); Yong-Ki Cho, Hwaseong-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 195 days.

(21) Appl. No.: 13/655,849

(22) Filed: Oct. 19, 2012

(65) Prior Publication Data

US 2013/0101011 A1   Apr. 25, 2013

Related U.S. Application Data

(60) Provisional application No. 61/549,493, filed on Oct. 20, 2011.

(30) Foreign Application Priority Data

Mar. 22, 2012   (KR) .................. 10-2012-0029572
Jun. 28, 2012   (KR) .................. 10-2012-0070337

(51) Int. Cl.
   *H03H 7/30*   (2006.01)
   *H04L 25/03*  (2006.01)
   (Continued)

(52) U.S. Cl.
   CPC ........ *H04L 25/0307* (2013.01); *H04L 25/0292* (2013.01); *H04L 25/03057* (2013.01);
   (Continued)

(58) Field of Classification Search
   CPC ............ H04L 25/03885; H04L 25/068; H04L 25/063; H04L 2025/0349; H04L 25/0292; H04L 25/03019; H04L 25/085
   USPC .................. 375/233, 232, 229, 346, 350, 316
   See application file for complete search history.

(56) References Cited

U.S. PATENT DOCUMENTS

| 7,025,503 B2 | 4/2006 | Plourde |
| 7,230,985 B2 | 6/2007 | Park et al. |

(Continued)

FOREIGN PATENT DOCUMENTS

| KR | 10-2004-0033856 A | 4/2004 |
| KR | 10-2011-0059220 A | 6/2011 |
| WO | WO 2007/034366 A2 | 3/2007 |

OTHER PUBLICATIONS

Won-Hwa Shin, Young-Hyun Jun, Bai-Sun Kong, Blined-oversampling adaptive oversample-level DFE receiver for unsynchronized global on-chip serial links, IEICE Electronics Express, vol. 10, No. 9, 1-6.

*Primary Examiner* — Leila Malek
(74) *Attorney, Agent, or Firm* — Muir Patent Law, PLLC (57) ABSTRACT

Provided are a data receiver circuit and a method of adaptively controlling an equalization coefficient using the same. The data receiver circuit includes n sampling receivers, n decision feedback equalizer (DFE) circuits, and a data recovery circuit. The n sampling receivers are configured to sample an input signal and output n respective sampling signals in response to n respective clock signals. The n DFE circuits are configured to equalize the n respective sampling signals in response to a DFE control signal and generate n respective pre-recovery signals in response to the n equalized sampling signals and n respective previous pre-recovery signals, the DFE control signal for changing an equalization ability of the n DFE circuits. The data recovery circuit is configured to select one of the n respective pre-recovery signals, and output the selected n pre-recovery signal as a recovered input signal.

19 Claims, 8 Drawing Sheets

(51) Int. Cl.
*H04L 25/02* (2006.01)
*H04L 25/06* (2006.01)
*H04L 25/08* (2006.01)

(52) U.S. Cl.
CPC ..... *H04L25/03885* (2013.01); *H04L 25/03019* (2013.01); *H04L 25/063* (2013.01); *H04L 25/068* (2013.01); *H04L 25/085* (2013.01); *H04L 2025/0349* (2013.01)

(56) References Cited

U.S. PATENT DOCUMENTS

| | | | |
|---|---|---|---|
| 7,519,130 B2 * | 4/2009 | Hsu et al. | 375/292 |
| 7,546,042 B2 * | 6/2009 | Lenosky et al. | 398/208 |
| 7,801,257 B2 | 9/2010 | Eglit | |
| 7,856,066 B2 * | 12/2010 | Tanaka et al. | 375/260 |
| 2004/0032905 A1 * | 2/2004 | Dittrich et al. | 375/233 |
| 2011/0129010 A1 | 6/2011 | Yang | |
| 2012/0290885 A1 * | 11/2012 | Mobin et al. | 714/56 |
| 2013/0034143 A1 * | 2/2013 | Acosta-Serafini et al. | 375/232 |

* cited by examiner

DATA RECEIVER CIRCUIT AND METHOD OF ADAPTIVELY CONTROLLING EQUALIZATION COEFFICIENTS USING THE SAME

CROSS-REFERENCE TO RELATED APPLICATION

This application claims the benefits of U.S. Patent Application No. 61/549,493 filed on Oct. 20, 2011, in the USPTO, and Korean Patent Application No. 10-2012-0029572 filed on Mar. 22, 2012, in the Korean Intellectual Property Office (KIPO), the disclosures of which are hereby incorporated by reference in their entirety.

BACKGROUND

1. Field

Example embodiments relate to a data receiver circuit and a method of adaptively controlling equalization coefficients using the same.

2. Description of Related Art

In general, the frequency spectrum of a signal may be degraded when the signal transfers through a transmission medium, such as a cable. Typically, the degradation may lead to attenuation of a high-frequency component in the frequency spectrum of the signal. Due to the frequency degradation, the transferred signal may have a narrow signal pulse which has a low peak amplitude. As a result, it may be difficult to recover encoded bit information of the signal pulse. Also, a signal applied to a receiver through the transmission medium may include a jitter noise. Similarly, it may be difficult to recover the signal including the jitter noise. To compensate for the frequency degradation, a signal processing process called an equalization process may be performed. The equalization process refers to a technique of decreasing the jitter noise of the applied signal and restoring the amplitude of the attenuated frequency component to the previous amplitude.

In a transceiver mainly used for an ultrahigh-speed serial interface, the transmission rate of serial data is gradually increasing to several Gbps or higher. Thus, with the increase in the transmission rate of the data, jitter noise of the receiver may significantly affect a process of recovering clock or data without errors in a clock and data recovery (CDR) block. The jitter noise may occur by inter-symbol interference (ISI) on signals received at through the interface. When a long cable or a printed circuit board (PCB) routing is used as a main medium, the ISI may increase. An equalizer may be added to the receiver to decrease inter-symbol interference (ISI).

SUMMARY

Some example embodiments provide a data receiver circuit.

Other embodiments provide a data receiver circuit and a method of adaptively controlling equalization coefficients using the same.

According to one example embodiment, a data receiver circuit includes an over-sampling circuit, a data recovery circuit, and a decision feedback equalizer (DFE) adaption control circuit. The over-sampling circuit is configured to over-sample an input signal in response to n clock signals each having n intervals in a clock cycle, generate n sampling signals, and output n pre-recovery signals in response to the n sampling signals and a decision feedback equalizer (DFE) adaptation control signal, n being a natural number. The data recovery circuit is configured to select one of the n pre-recovery signals, generate n transition detection signals each indicating a corresponding interval and a number of transitions of the input signal that occur at the corresponding interval in response to the n clock signals and the n pre-recovery signals and output a lowest data transition detection signal indicating an $X^{th}$ interval of one clock cycle and a highest data transition detection signal indicating a $Y^{th}$ interval of one clock cycle among the n transition detection signals. The DFE adaptation control circuit is configured to output the DFE adaptation control signal in response to the lowest data transition detection signal and the highest data transition detection signal. The $X^{th}$ interval corresponds to an interval determined to have a lowest number of transitions of the input signal and the $Y^{th}$ interval corresponds to an interval determined to have a highest number of transitions of the input signal.

According to another example embodiment, a data receiver circuit includes n over-sampling circuits, a data recovery circuit, and a decision feedback equalizer (DFE) adaptation control circuit. The n over-sampling circuits are configured to receive n respective clock signals and an input signal, generate n respective sampling signals, and latch n respective equalizing signals generated in response to the n respective sampling signals and a DFE control signal to output n respective pre-recovery signals, n being a natural number. The data recovery circuit is configured to receive the n clock signals and the n pre-recovery signals and output a recovered input signal, a lowest data transition detection signal, and a highest data transition detection signal. The DFE adaptation control circuit is configured to generate the DFE control signal in a first mode using the highest data transition detection signal and generate the DFE control signal in a second mode using the lowest data transition detection signal. The lowest data transition detection signal indicates an $X^{th}$ interval of one clock cycle, the $X^{th}$ interval corresponding to an interval determined to have a lowest number of transitions of the input signal. The highest data transition detection signal indicates an $Y^{th}$ interval of one clock cycle, the $Y^{th}$ interval corresponding to an interval determined to have a highest number of transitions of the input signal.

According to further example embodiment, a receiver circuit includes n sampling receivers, n decision feedback equalizer (DFE) circuits, and a data recovery circuit. The n sampling receivers are configured to sample an input signal and output n respective sampling signals in response to n respective clock signals each having n intervals within a clock cycle, n being a natural number. The n decision feedback equalizer (DFE) circuits are configured to equalize the n respective sampling signals in response to a DFE control signal and generate n respective pre-recovery signals in response to the n equalized sampling signals and n respective previous pre-recovery signals, the DFE control signal for changing an equalization ability of the n DFE circuits. The data recovery circuit is configured to select one of the n respective pre-recovery signals, and output the selected n pre-recovery signal as a recovered input signal.

BRIEF DESCRIPTION OF THE DRAWINGS

Exemplary embodiments will be more clearly understood from the following detailed description taken in conjunction with the accompanying drawings in which.

DETAILED DESCRIPTION OF THE EMBODIMENTS

Various embodiments will now be described more fully with reference to the accompanying drawings in which some embodiments are shown. This disclosure may, however, be embodied in different forms and should not be construed as limited to the embodiments set forth herein. Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms such as "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
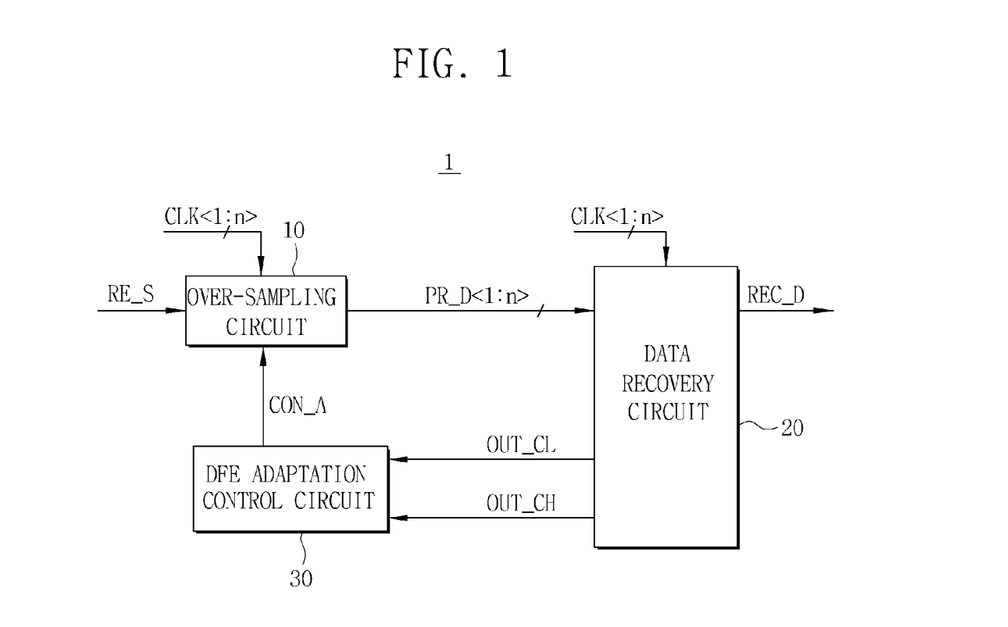
FIG. 1 is a block diagram of a data receiver circuit according to an embodiment.

FIG. 1 is a block diagram of a data receiver circuit 1 according to an embodiment.

Referring to FIG. 1, the data receiver circuit 1 according to one embodiment may include an over-sampling circuit 10, a data recovery circuit 20, and a decision feedback equalizer (DFE) adaptation control circuit 30.

The over-sampling circuit 10 may receive a receiver input signal RE_S and a DFE control signal CON_A, and output first through n-th pre-recovery signals PR_D<1:n> in response to first through n-th clock signals CLK<1:n>.

The over-sampling circuit 10 may receive the first through n-th clock signals CLK<1:n>, equalize first through n-th sampling signals SA_S<1:n> obtained by sampled the receiver input signal RE_S in response to feed-back first through n-th pre-recovery signals PR_D<1:n> based on an equalization coefficient equalized by the DFE control signal CON_A, and output the first through n-th pre-recovery signals PR_D<1:n>.

In this case, the DFE control signal CON_A may control the equalization coefficient to output optimally recovered data REC_D.

The data recovery circuit 20 may receive the first through n-th clock signals CLK<1:n> and the first through n-th pre-recovery signals PR_D<1:n>, and output recovered data REC_D, a lowest data transition detection signal OUT_CL, and a highest data transition detection signal OUT_CH.

The DFE adaptation control circuit 30 may receive the lowest data transition detection signal OUT_CL and the highest data transition detection signal OUT_CH, and output the DFE control signal CON_A.

Figure 2:
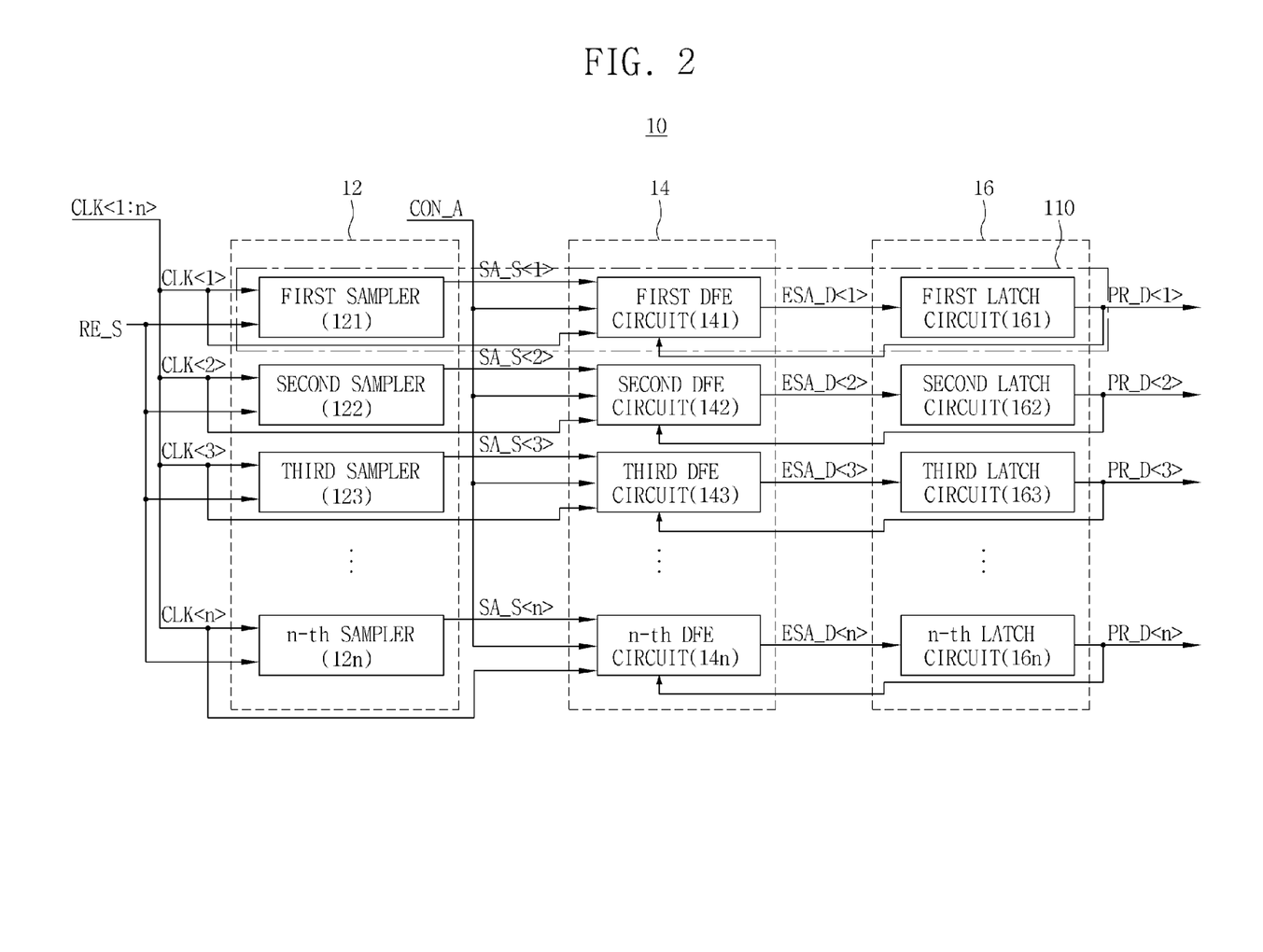
FIG. 2 is a block diagram of a configuration of an over-sampling circuit included in the data receiver circuit shown in FIG. 1 according to an embodiment.

FIG. 2 is a block diagram of a configuration of the over-sampling circuit 10 included in the data receiver circuit 1 shown in FIG. 1.

Referring to FIG. 2, the over-sampling circuit 10 may include an over-sampler 12, a DFE circuit 14, and a latch circuit 16.

The over-sampler 12 may include first through n-th samplers 121 to 12$n$ configured to synchronize the first through n-th clock signals CLK<1:n> with the input signal RE_S, and output the sampled first through n-th sampling signals SA_S<1:n>. For example, the first sampler 121 may sample the first clock signal CLK<1> by synchronizing the first clock signal CLK<1> with the receiver input signal RE_S, and generate the first sampling signal SA_S<1>. The second sampler 122 may sample the second clock signal CLK<2> by synchronizing the second clock signal CLK<2> with the receiver input signal RE_S, and generate the second sampling signal SA_S<2>. The third sampler 123 may sample the third clock signal CLK<3> by synchronizing the third clock signal CLK<3> with the receiver input signal RE_S, and generate the third sampling signal SA_S<3>. Finally, the n-th sampler 12$n$ may sample the n-th clock signal CLK<n> by synchronizing the n-th clock signal CLK<n> with the receiver input signal RE_S, and generate the n-th sampling signal SA_S<n>. In this case, an m-th clock signal CLK<m> may be phase-delayed by 360°/n later than an m−1-th clock signal CLK<m−1>. Here, m may be any one of integers ranging from 2 to n.

The DFE circuit 14 may include first through n-th DFE circuits 141 to 14$n$ configured to receive the first through n-th clock signals CLK<1:n>, equalize the first through n-th sampling signals SA_S<1:n> in response to the feed-back first through n-th pre-recovery signals PR_D<1:n> based on an equalization coefficient controlled by the DFE control signal CON_A, and output first through n-th equalizing signals ESA_D<1:n>. For example, the first DFE circuit 141 may receive the first clock signal CLK<1>, equalize the first sampling signal SA_S<1> in response to the feed-back first pre-recovery signal PR_D<1> based on the equalization coefficient controlled by the DFE control signal CON_A, and output the first equalizing signal ESA_D<1>. The second DFE circuit 142 may receive the second clock signal CLK<2>, equalize the second sampling signal SA_S<2> in response to the feed-back second pre-recovery signal PR_D<2> based on the equalization coefficient controlled by the DFE control signal CON_A, and output the second equalizing signal ESA_D<2>. The third DFE circuit 143 may receive the third clock signal CLK<3>, equalize the third sampling signal SA_S<3> in response to the feed-back third pre-recovery signal PR_D<3> based on the equalization coefficient controlled by the DFE control signal CON_A, and output the third equalizing signal ESA_D<3>. Finally, the n-th DFE circuit 14n may receive the n-th clock signal CLK<n>, equalize the n-th sampling signal SA_S<n> in response to the feed-back n-th pre-recovery signal PR_D<n> based on the equalization coefficient controlled by the DFE control signal CON_A, and output the n-th equalizing signal ESA_D<n>.

The latch circuit 16 may include first through n-th latch circuits 161 to 16n configured to latch the first through n-th equalizing signals ESA_D<1:n> output by the first through n-th DFE circuits 141 to 14n, and output first through n-th pre-recovery signals PR_D<1:n>. For instance, the first latch circuit 161 may latch the first equalizing signal ESA_D<1> and output the first pre-recovery signal PR_D<1>. The second latch circuit 162 may latch the second equalizing signal ESA_D<2> and output the second pre-recovery signal PR_D<2>. The third latch circuit 163 may latch the third equalizing signal ESA_D<3> and output the third pre-recovery signal PR_D<3>. Finally, the n-th latch circuit 16n may latch the n-th equalizing signal ESA_D<n> and output the n-th pre-recovery signal PR_D<n>.

Figure 3:
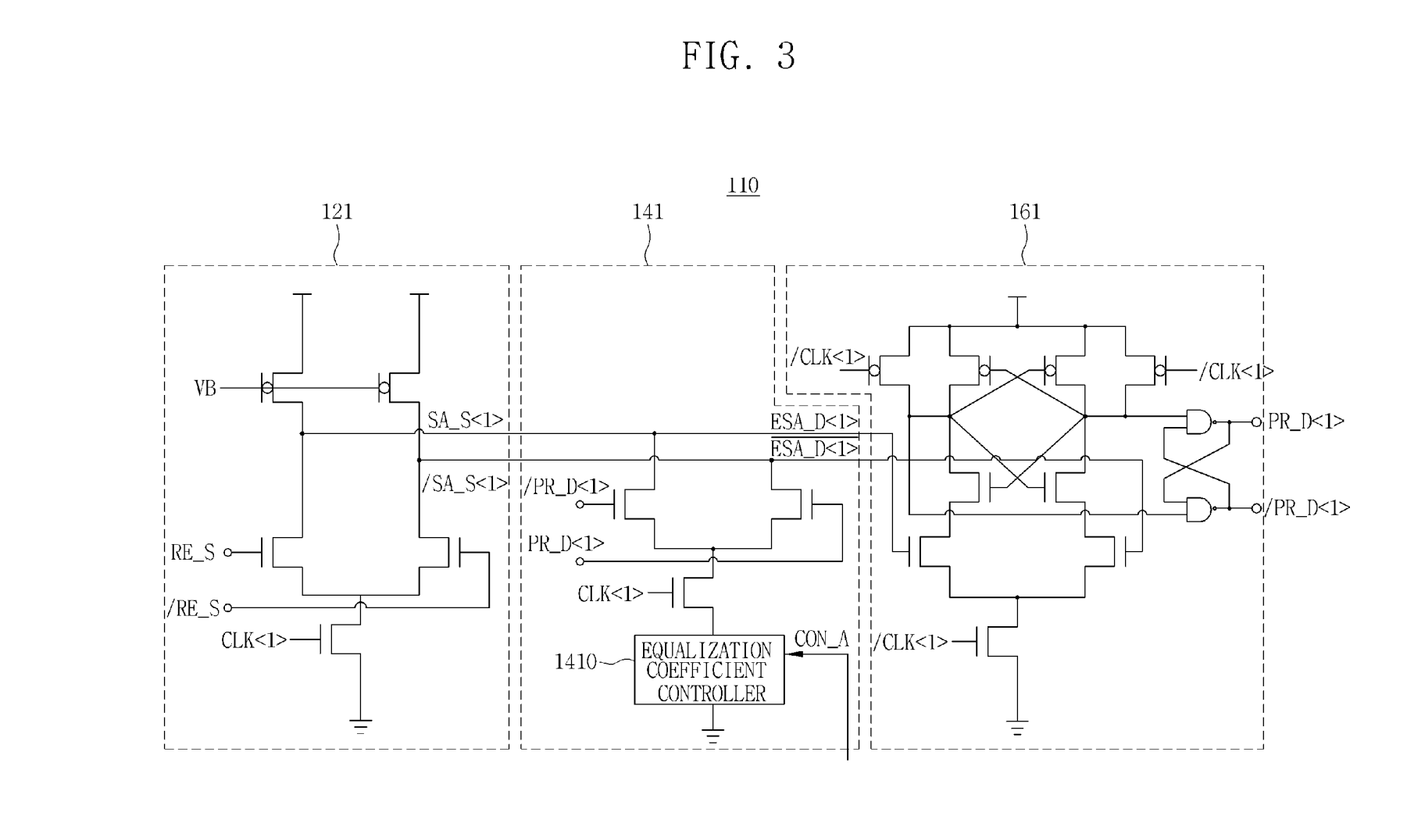
FIG. 3 is a detailed circuit diagram of an over-sampling receiver of the over-sampling circuit shown in FIG. 2, according to an embodiment.
Figure 4:
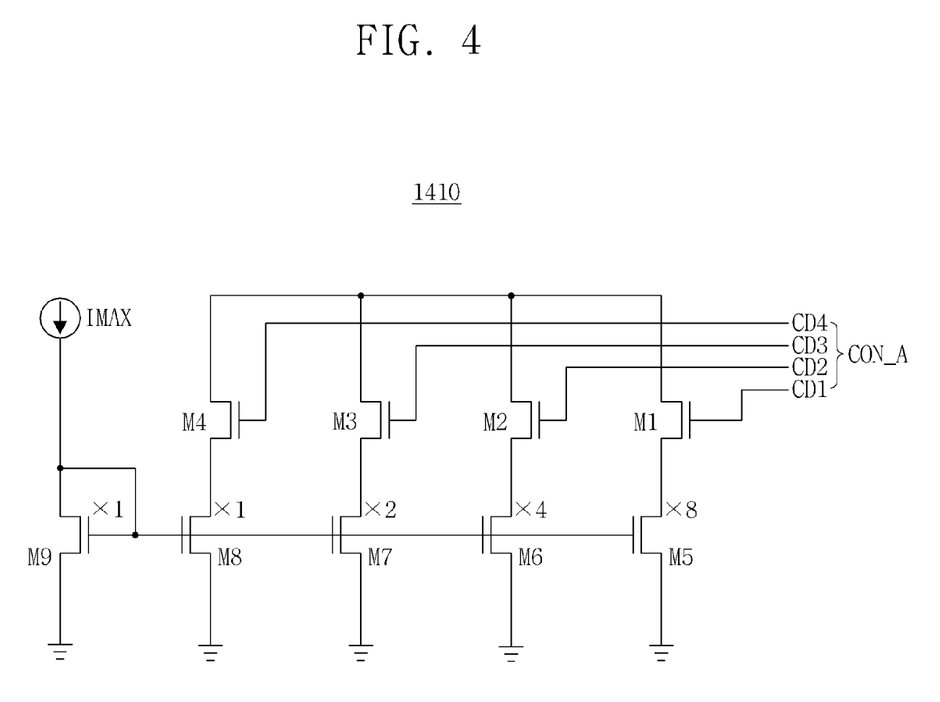
FIG. 4 is a detailed circuit diagram of a configuration of an equalization coefficient controller shown in FIG. 3 according to an embodiment.

FIG. 3 is a detailed circuit diagram of an over-sampling receiver 110 of the over-sampling circuit 10 shown in FIG. 2, according to an embodiment, and FIG. 4 is a detailed circuit diagram of a configuration of the equalization coefficient controller 1410 shown in FIG. 3 according to an embodiment.

Referring to FIG. 3, the over-sampling receiver 110 may receive the input signal RE_S, sample the receiver input signal RE_S in synchronization with the first clock signal CLK<1>, and generate a first sampling signal SA_S<1> and /SA<1>. Also, the over-sampling receiver 110 may equalize the first sampling signal SA_S<1> and /SA<1> in response to a feed-back first pre-recovery signal PR_D<1> and /PR_D<1> based on an equalization coefficient controlled by a DFE control signal CON_A, and generate a first equalizing signal ESA_D<1> and /ESA_D<1>. Also, the over-sampling receiver 110 may latch the first equalizing signal ESA_D<1> and /ESA_D<1> and output a first pre-recovery signal PR_D<1> and /PR_D<1>.

For example, the first over-sampler 121 may sample the first clock signal CLK<1> by synchronizing the first clock signal CLK<1> with the input signal RE_S, and output the first sampling signal SA_S<1> and /SA<1>.

The first DFE circuit 141 may equalize the first sampling signal SA_S<1> and /SA<1> in response to the feed-back first pre-recovery signal PR_D<1> and /SAM_D<1> based on the equalization coefficient controlled by the DFE control signal CON_A, and output a first equalizing signal ESA_D<1> and /ESA_D<1>.

The equalization coefficient controller 1410 may control the rate of voltage drop in voltage level of the first sampling signal SA_S<1> and /SA<1> based on an equalization coefficient. For example, as the equalization coefficient increases, the voltage drop rate of the voltage level of the first sampling signal SA_S<1> and /SA<1> may increase. In this case, the equalization coefficient may be controlled according to the DFE control signal CON_A.

Referring to FIG. 4, the DFE control signal CON_A may be a 4-bit control code having first through fourth control codes CD1 to CD4.

The equalization coefficient controller 1410 may include first through fourth control transistors M1 to M4, first through fourth coefficient decision transistors M5 to M8 connected in series to the first through fourth control transistors M1 to M4, respectively, and a connection transistor M9 connected in parallel to the first through fourth coefficient decision transistors M5 to M8.

In one embodiment, when the size of the fourth coefficient decision transistor M8 is 1, a size ratio among the first through fourth coefficient decision transistors M5 to M8 may be set as 8:4:2:1.

A current pass ratio among the first through fourth coefficient decision transistors M5 to M8 may be proportional to the size ratio among the first through fourth coefficient decision transistors M5 to M8. That is, a current pass rate of each of the first through fourth coefficient decision transistors M5 to M8 may increase with an increase in the size of each of the first through fourth coefficient decision transistors M5 to M8.

For example, when '0, 1, 0, 0' are input as the first through fourth control codes CD1 to CD4, the first control code CD1 may be 0, the second control code CD2 may be 1, the third control code CD3 may be 0, and the fourth control code CD4 may be 0. Since only the second control transistor M2 is turned on in response to the first through fourth control codes CD1 to CD4 corresponding to '0100', current for dropping the voltage level of the first sampling signal SA_S<1> and /SA<1> may flow through only a path including the second control transistor M2 and the second coefficient decision transistor M6.

In addition, when '0, 1, 0, 1' are input as the first through fourth control codes CD1 to CD4, the first control code CD1 may be 0, the second control code CD2 may be 1, the third control code CD3 may be 0, and the fourth control code CD4 may be 1. Since only the second control transistor M2 and the fourth control transistor M4 are turned on in response to the first through fourth control codes CD1 to CD4 corresponding to '0101', current for dropping the voltage level of the first sampling signal SA_S<1> and /SA<1> may flow through only a path including the second control transistor M2 and the second coefficient decision transistor M6 and a path including the fourth control transistor M4 and the fourth coefficient decision transistor M8.

Since a voltage drop enabled by inputting '0, 1, 0, 1' as the first through fourth control codes CD1 to CD4 is greater than a voltage drop enabled by inputting '0, 1, 0, 0' as the first through fourth control codes CD1 to CD4, the rate of the voltage drop in the first sampling signal SA_S<1> and /SA<1> may increase.

To sum up, the voltage drop rate of the first sampling signal SA_S<1> and /SA<1 may increase with an increase in value of the first through fourth control codes CD1 to CD4. That is, it may be seen that an equalization coefficient for the first sampling signal SA_S<1> and /SA<1> may increase.

The first latch circuit 161 may latch the first equalizing signal ESA_D<1> and /ESA_D<1> and output the first pre-recovery signal PR_D<1> and /PR_D<1>.

Figure 5:
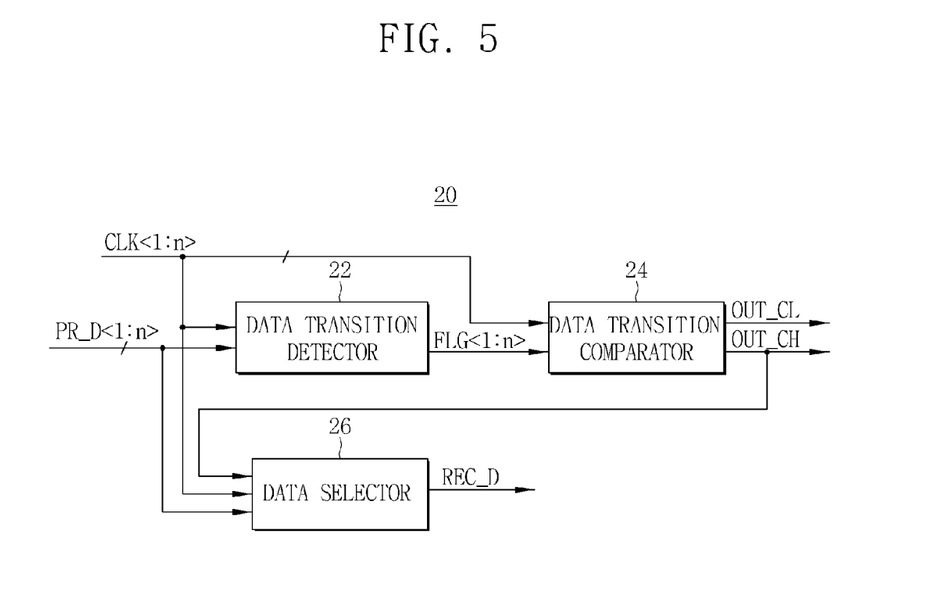
FIG. 5 is a block diagram of a configuration of a data recovery circuit included in the data receiver circuit shown in FIG. 1 according to an embodiment.
Figure 6:
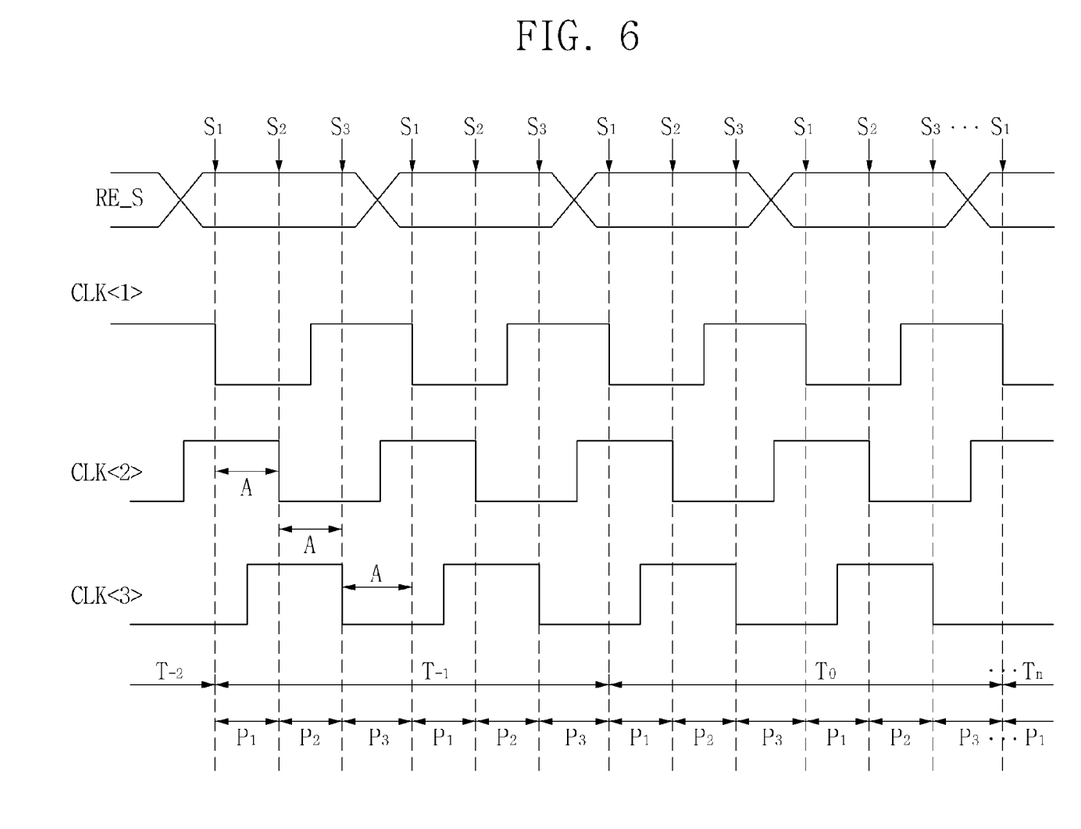
FIG. 6 is a timing diagram illustrating a method of adaptively controlling equalization coefficients using a data receiver circuit according to an embodiment.

FIG. 5 is a block diagram of a configuration of a data recovery circuit 20 included in the data receiver circuit 1 shown in FIG. 1 according to an embodiment, and FIG. 6 is a timing diagram illustrating a method of adaptively controlling equalization coefficients using the data receiver circuit 1 according to an embodiment.

Referring to FIG. 5, the data recovery circuit 20 may include a data transition detector 22, a data transition comparator 24, and a data selector 26.

The data transition detector 22 may receive first through n-th clock signals CLK<1:n> and first through n-th pre-recovery signals PR_D<1:n>, and detect and output first through n-th transition detection signals FLG<1:n>.

Referring to FIG. 6, in the case of 3-over-sampling, first through third transition detection signals FLG<1:3> may include information regarding data transitions that occur during data transition detection cycles $T_{-2}$ to $T_n$ at first through third sampling intervals $P_1$ to $P_3$ between the first through third clock signals CLK<1:3>. That is, the first transition detection signal FLG<1> may include the positions (i.e., intervals) and number of data transitions that occur during each of the data transition detection cycles $T_{-2}$ to $T_n$ at the first sampling interval $P_1$. The second transition detection signal FLG<2> may include the positions and number of data transitions that occur during each of the data transition detection cycles $T_{-2}$ to $T_n$ at the second sampling interval $P_2$. The third transition detection signal FLG<3> may include the positions and number of data transitions that occur during each of the data transition detection periods $T_{-2}$ to $T_n$ at the third sampling interval $P_3$. In this case, although it is assumed that each of the data transition detection cycles $T_{-2}$ to $T_n$ has a cycle of three clocks, the inventive concept is not limited thereto and each of the data transition detection cycles $T_{-2}$ to $T_n$ may have a cycle of two clocks or a cycle of three clocks or more.

The first sampling interval $P_1$ may be between a first sampling time point $S_1$ of the first clock signal CLK<1> and a second sampling time point $S_2$ of the second clock signal CLK<2>, the second sampling interval $P_2$ may be between the second sampling time point $S_2$ of the second clock signal CLK<2> and a third sampling time point $S_3$ of the third clock signal CLK<3>, and the third sampling time point $P_3$ may between a third sampling time point $S_3$ of the third clock signal CLK<3> and the first sampling time point $S_1$ of the first clock signal CLK<1>. In this case, each of the first through third clock signals CLK<1:3> may be delayed by an interval A and input.

The data transition comparator 24 may output a lowest data transition detection signal OUT_CL and a highest data transition detection signal OUT_CH in response to the first through n-th transition detection signals FLG<1:n> based on the first through n-th clock signals CLK<1:n>.

The lowest data transition detection signal OUT_CL may include information regarding positions of the first through n-th sampling intervals $P_1$ to $P_n$ where the smallest number of data transitions averagely occur, and the number of data transitions among information regarding the number of data transitions that occur at the first through n-th sampling intervals $P_1$ to $P_n$ during the data transition detection cycles $T_{-n}$ to $T_n$. The highest data transition detection signal OUT_CH may include information regarding positions of the first through n-th sampling intervals $P_1$ to $P_n$ where the largest number of data transitions averagely occur, and the number of data transitions among the information regarding the number of data transitions that occur at the first through n-th sampling intervals $P_1$ to $P_n$ during the data transition detection cycles $T_{-n}$ to $T_n$.

For example, across a plurality of transition detection cycles (e.g., $T_{-2}$, $T_{-1}$, $T_0$, etc.), an $X^{th}$ interval (e.g., a first occurring interval of the three intervals shown, labeled $P_1$) may be an interval that has a lowest number of data transitions of the input signal, compared to other intervals (e.g., second and third occurring intervals, labeled $P_2$ and $P_3$) across the plurality of detection cycles $T_{-2}$, $T_{-1}$, $T_0$, etc. In certain embodiments, the $X^{th}$ interval of each transition detection cycle may have the lowest number of data transitions of the input signal among the intervals for that transition detection cycle (e.g., the first interval for all of the cycles may have the lowest number of data transitions for those cycles). However, this need not be the case, and different intervals for the different transition detection cycles may have the lowest number of transitions for those cycles. Also, across a plurality of transition detection cycles (e.g., $T_{-2}$, $T_{-1}$, $T_0$, etc.), a $Y^{th}$ interval (e.g., a second occurring interval of the three intervals shown, labeled $P_2$) may be an interval that has a highest number of data transitions of the input signal, compared to other intervals (e.g., first and third occurring intervals, labeled $P_1$ and $P_3$) across the plurality of detection cycles $T_{-2}$, $T_{-1}$, $T_0$, etc. In certain embodiments, the $Y^{th}$ interval of each transition detection cycle may have the highest number of data transitions of the input signal among the intervals for that transition detection cycle (e.g., the second interval for all of the cycles may have the highest number of data transitions for those cycles). However, this need not be the case, and different intervals for the different transition detection cycles may have the highest number of transitions for those cycles.

The data selector 26 may receive the first through n-th pre-recovery signals PR_D<1:n> in response to the first through n-th clock signals CLK<1:n>, and output recovered data REC_D in response to the highest data transition detection signal OUT_CH. The data selector 26 may select one of the first through n-th pre-recovery signals PR_D<1:n> as recovered data REC_D using the highest data transition detection signal OUT_CH.

Figure 7:
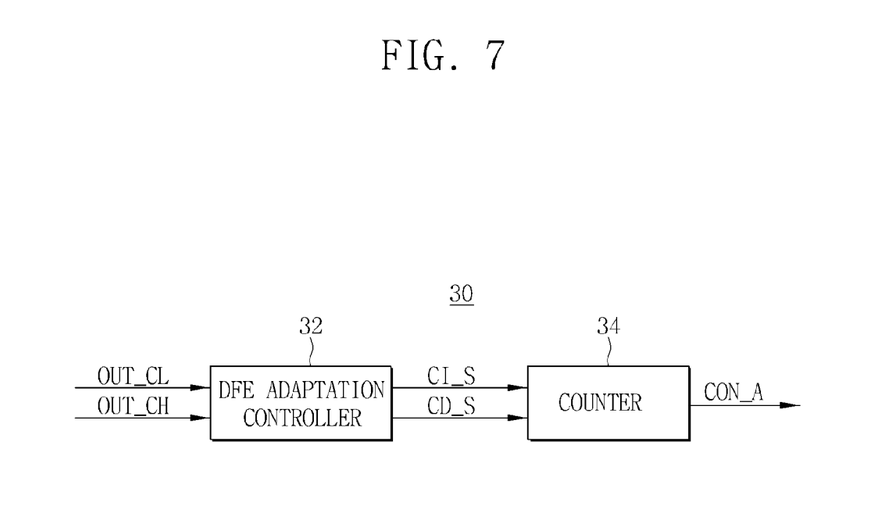
FIG. 7 is a block diagram of a configuration of a decision feedback equalizer (DFE) adaptation control circuit included in the data receiver circuit shown in FIG. 1 according to an embodiment.

FIG. 7 is a block diagram of a configuration of a DFE adaptation control circuit 30 included in the data receiver circuit 1 shown in FIG. 1 according to an embodiment.

Referring to FIG. 7, the DFE adaptation control circuit 30 may include a DFE adaptation controller 32 and a counter 34.

The DFE adaptation controller 32 may receive a lowest data transition detection signal OUT_CL and a highest data transition detection signal OUT_CH, and output an increase control signal CI_S and a decrease control signal CD_S capable of respectively increasing and decreasing the DFE control signal CON_A having first through fourth control codes CD1 to CD4 by 1.

The increase control signal CI_S may increase the value of each of the first through fourth control codes CD1 to CD4 by 1 when positions of the first through n-th sampling intervals $P_1$ to $P_n$ and the number of data transitions, which are included in the highest data transition detection signal OUT_CH during the data transition detection cycle $T_0$ in an initialized control code, are changed as compared with positions of the first through n-th sampling intervals $P_1$ to $P_n$ and the number of data transitions, which are included in the highest data transition detection signal OUT_CH during the data transition detection cycle $T_{-1}$ which is a previous data transition detection cycle of the data transition detection cycle $T_0$. In one embodiment, if the interval in which the highest data transition occurs is not changed in a predetermined period, the counter 34 may set to a coarse control code setting mode.

The increase control signal CI_S may increase or the decrease control signal CD_S may decrease when the number of data transitions included in the lowest data transition detection signal OUT_CL during the data transition detection cycle $T_0$ after setting the coarse control code setting mode is changed as compared with the number of data transitions included in the lowest data detection transition signal OUT_CL during the data transition detection cycle $T_{-1}$. In one embodiment, if the interval in which the lowest data transition occurs is not changed in a predetermined period, the counter 34 may set to an optimum control code setting mode.

The counter 34 may receive the increase control signal CI_S and the decrease control signal CD_S, and output the DFE control signal CON_A. The counter 34 may output a DFE control signal CON_A obtained by increasing the first through fourth control codes CD1 to CD4 by 1 when the increase control signal CI_S is input to the counter 34, and output a DFE control signal CON_A obtained by decreasing the first through fourth control codes CD1 to CD4 by 1 when the decrease control signal CD_S is input to the counter 34.

Figure 8:
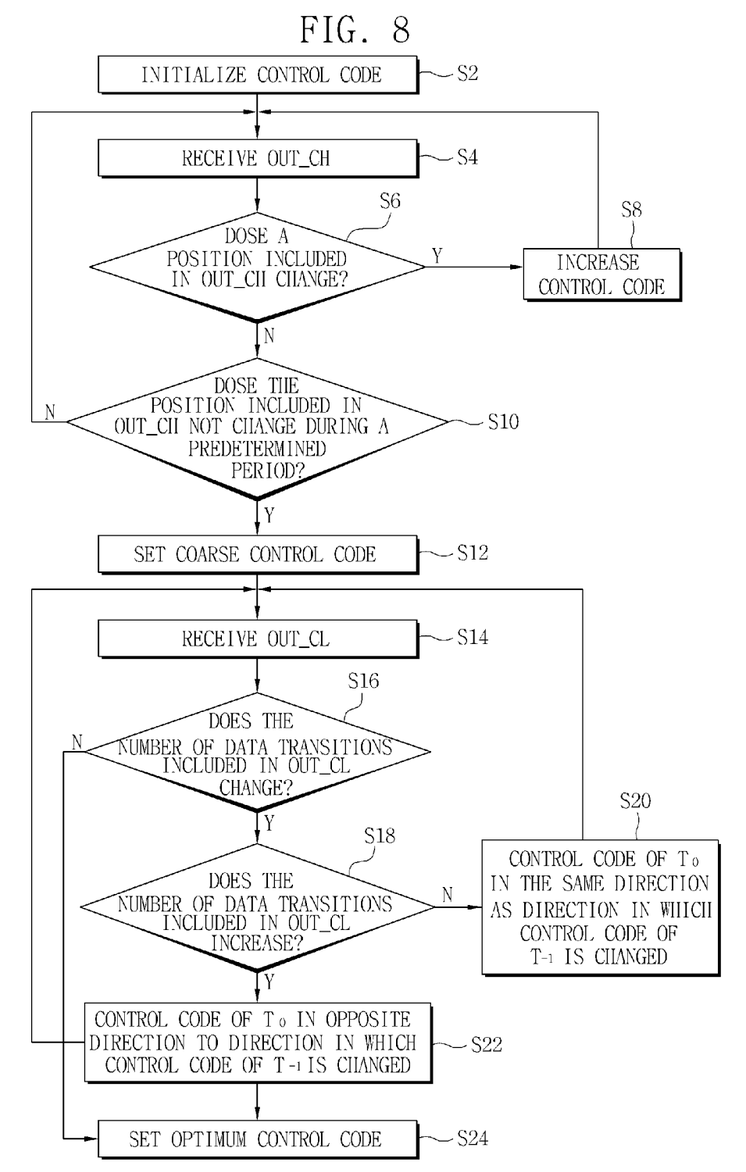
FIG. 8 is a flowchart illustrating a method of adaptively controlling equalization coefficients using a data receiver circuit according to an embodiment.

FIG. 8 is a flowchart illustrating a method of adaptively controlling equalization coefficients using a data receiver circuit 1 according to an embodiment.

Referring to FIG. 8, the DFE adaptation controller 32 may initialize first through fourth control codes CD1 to CD4 (operation S2). The first through fourth control codes CD1 to CD4 may be initialized to '0, 0, 0, 0'.

Next, the DFE adaptation controller 32 may receive the highest data transition detection signal OUT_CH output by the data recovery circuit 20 (operation S4) for setting a coarse control code.

Referring to FIG. 7, the DFE adaptation controller 32 may compare position of the first through n-th sampling intervals $P_1$ to $P_n$, which is included in the highest data transition detection signal OUT_CH during the data transition detection cycle $T_0$, is compared with position of the first through n-th sampling intervals $P_1$ to $P_n$ which is included in the highest data transition detection signal OUT_CH during the data transition detection cycle $T_{-1}$ and detect whether the position of the first through n-th sampling intervals $P_1$ to $P_n$ is changed (operation S6). For instance, when comparing a case where the highest number of data transitions are included in the highest data transition detection signal OUT_CH at the first sampling interval $P_1$ during the data transition detection cycle $T_{-1}$ with a case where the highest number of data transitions are included in the highest data transition detection signal OUT_CH at the second sampling interval $P_2$ during the data transition detection cycle $T_0$, the DFE adaptation controller 32 may output the increase control signal CI_S (operation S8). That is, when the position of the first through third sampling intervals $P_1$ to $P_3$, which is included in the highest data transition detection signal OUT_CH during the data transition detection cycle $T_0$, is changed as compared with the position of the first through third sampling intervals $P_1$ to $P_3$, which is included in the highest data transition detection signal OUT_CH during the data transition detection cycle $T_{-1}$, the counter 34 may receive the increase control signal CI_S. The counter 34 may output a DFE control signal CON_A obtained by increasing each of the first through fourth control codes CD1 to CD4 by 1, and control an equalization coefficient.

Meanwhile, when the position of the first through third sampling intervals $P_1$ to $P_3$, which is included in the highest data transition detection signal OUT_CH detected in the data transition detection cycle $T_{-1}$, is not changed as compared with the position of the first through third sampling intervals $P_1$ to $P_3$, which is included in the highest data transition detection signal OUT_CH detected during the data transition detection cycle $T_0$, the DFE adaptation controller 32 may decide the position of the first through third sampling intervals $P_1$ to $P_3$ included in the highest data transition detection signal OUT_CH is maintained during a predetermined cycle (operation S10).

When the position of the first through third sampling intervals $P_1$ to $P_3$ included in the highest data transition detection signal OUT_CH is not maintained during the predetermined cycle, the DFE adaptation controller 32 may receive the highest data transition detection signal OUT_CH output by the data recovery circuit 20 to set a coarse control code.

Meanwhile, when the positions of the first through third sampling intervals $P_1$ to $P_3$ included in the highest data transition detection signal OUT_CH are maintained during the predetermined cycle (operation S10), the counter 34 may set the coarse control code (operation S12).

Next, the DFE adaptation controller 32 may receive the lowest data transition detection signal OUT_CL output by the data recovery circuit 20 (operation S14) for setting an optimal control code setting mode.

Referring to FIG. 7, the DFE adaptation controller 32 may detect whether the number of data transitions included in the lowest data transition detection signal OUT_CL during the data transition detection cycle $T_0$ is changed as compared with the number of data transitions included in the lowest data transition detection signal OUT_CL during the data transition detection cycle $T_{-1}$ (operation S16). For instance, when the lowest data transition detection signal OUT_CH has one data transition at the third sampling interval $P_3$ during the data transition detection cycle $T_{-1}$, and has one data transition at the third sampling interval $P_3$ during the current data transition detection cycle $T_0$, the counter 34 may set an optimum control code (operation 24). Accordingly, the equalization coefficient controller 1410 may control an equalization coefficient according to the current DFE control signal CON_A including the first through fourth control codes CD1 to CD4, and output the controlled equalization coefficient.

In one embodiment, when the lowest data transition detection signal OUT_CL has two data transitions at the third sampling interval $P_3$ during the data transition detection cycle $T_{-1}$, and has one data transition at the third sampling interval $P_3$ during the data transition detection cycle $T_0$ (operation S18), the DFE adaptation controller 32 may control the first through fourth control codes CD1 to CD4 of the data transition detection cycle $T_0$ in the same direction as a direction in which the first through fourth control codes CD1 to CD4 of the data transition detection cycle $T_{-1}$ are changed (operation S20).

For example, when the first through fourth control codes CD1 to CD4 are increased in the data transition detection cycle $T_{-1}$, the DFE adaptation controller 32 may output the increase control signal CI_S to increase the first through fourth control codes CD1 to CD4 in the data transition detection cycle $T_0$. When the first through fourth control codes CD1 to CD4 are decreased in the data transition detection cycle $T_{-1}$, the DFE adaptation controller 32 may output the decrease control signal CD_S to decrease the first through fourth control codes CD1 to CD4 in the data transition detection cycle $T_0$. In this case, the direction in which the first through fourth control codes CD1 to CD4 are changed in the data transition detection cycle $T_{-1}$ may be decided by comparing the first through fourth control codes CD1 to CD4 of the data transition detection cycle $T_{-1}$ with the first through fourth control codes CD1 to CD4 set in the data transition detection cycle $T_{-2}$.

In one embodiment, when the number of data transitions included in the lowest data transition detection signal OUT_CL increases, the DFE adaptation controller 32 may control the first through fourth control codes CD1 to CD4 of the data transition detection cycle $T_0$ in an opposite direction to the direction in which the first through fourth control codes CD1 to CD4 are changed in the data transition detection cycle $T_{-1}$ (operation S22).

For example, referring to FIG. 6, in a case where the lowest data transition detection signal OUT_CL has two data transitions in the third sampling interval $P_3$ of the data transition detection cycle $T_{-1}$, and has three data transitions in the third sampling interval $P_3$ of the data transition detection cycle $T_0$, the DFE adaptation controller 32 may output the decrease control signal CD_S to decrease the first through fourth control codes CD1 to CD4 in the data transition detection cycle $T_0$ when the first through fourth control codes CD1 to CD4 are increased in the data transition detection cycle $T_{-1}$, and output the increase control signal CI_S to increase the first through fourth control codes CD1 to CD4 in the data transition detection cycle $T_0$ when the first through fourth control codes CD1 to CD4 are decreased in the data transition detection cycle $T_1$. In this case, the direction in which the first through fourth control codes CD1 to CD4 of the data transition detection cycle $T_{-1}$ are changed may be decided as compared with the first through fourth control codes CD1 to CD4 set during the data transition detection cycle $T_{-2}$ prior to the data transition detection cycle $T_{-1}$.

For example, when the lowest data transition detection signal OUT_CL has three data transitions in the third sampling interval $P_3$ of the data transition detection cycle $T_{-1}$, and has three data transitions in the third sampling interval $P_3$ of the data transition detection cycle $T_0$, the counter 34 may set to an optimum control code setting mode (operation S24).

In a data receiver circuit and a method of adaptively controlling an equalization coefficient according to various embodiments, inter-symbol-interference (ISI) can be effectively removed using over-sampling and an equalizer. That is, ISI can be effectively removed by rapidly responding to noise or a change in the state of a channel.

The foregoing is illustrative of embodiments and is not to be construed as limiting thereof. Although a few embodiments have been described, those skilled in the art will readily appreciate that many modifications are possible without materially departing from the novel teachings and advantages. Accordingly, all such modifications are intended to be included within the scope of this disclosure as defined in the claims. In the claims, means-plus-function clauses are intended to cover the structures described herein as performing the recited function, and not only structural equivalents but also equivalent structures.

What is claimed is:

1. A data receiver circuit comprising:
    an over-sampling circuit configured to over-sample an input signal in response to n clock signals each having n intervals in a clock cycle, generate n sampling signals, and output n pre-recovery signals in response to the n sampling signals and a decision feedback equalizer (DFE) adaptation control signal, n being a natural number equal to or greater than 2;
    a data recovery circuit configured to select one of the n pre-recovery signals, generate n data transition detection signals each indicating a corresponding interval and a number of transitions of the input signal that occur at the corresponding interval in response to the n clock signals and the n pre-recovery signals, and output a lowest data transition detection signal indicating an $X^{th}$ interval of one clock cycle and a highest data transition detection signal indicating a $Y^{th}$ interval of one clock cycle among the n transition detection signals; and
    a DFE adaptation control circuit configured to output the DFE adaptation control signal in response to the lowest data transition detection signal and the highest data transition detection signal,
    wherein the $X^{th}$ interval corresponds to an interval determined to have a lowest number of transitions of the input signal, and
    wherein the $Y^{th}$ interval corresponds to an interval determined to have a highest number of transitions of the input signal.

2. The data receiver circuit of claim 1, wherein the lowest data transition detection signal further indicates a group of $X^{th}$ intervals of m clock cycles and the highest data transition detection signal further indicates a group of $Y^{th}$ intervals of the m clock cycles, m being a natural number greater than 1.

3. The data receiver circuit of claim 1, wherein each of the n sampling signals includes differential pair signals, and
    wherein the over-sampling circuit is further configured to equalize respective differential pair signals in response to the DFE adaptation control signal and respective feed back n pre-recovery signals.

4. The data receiver circuit of claim 3, wherein the DFE adaptation control circuit is configured to output the DFE adaptation control signal which is configured to change equalization ability of the respective differential pair signals.

5. The data receiver circuit of claim 1, wherein the over-sampling circuit includes n over-sampling circuits corresponding respectively to the n clock signals,
    wherein each of the n over-sampling circuits includes:
    a sampler configured to sample the input signal in response to a clock signal, and output sampling signals;
    a decision feedback equalizer (DFE) configured to equalize the sampling signals in response to a feed-back pre-recovery signal and the DFE adaption control signal; and
    a latch circuit configured to output the pre-recovery signal in response to the equalized sampling signals.

6. The data receiver circuit of claim 5, wherein the DFE includes an equalization coefficient controller configured to control an equalization coefficient of the DFE according to the DFE adaption control signal.

7. The data receiver circuit of claim 6, wherein the equalization coefficient indicates a voltage drop rate in voltage level of each of the sampling signals.

8. The data receiver circuit of claim 3, wherein the data recovery circuit is configured to select one of the n pre-recovery signals in response to the highest data transition detection signal, and output the selected signal as a recovered input signal.

9. The data receiver circuit of claim 8, wherein the data recovery circuit comprises:
    a data transition detector configured to receive the n clock signals and the n pre-recovery signals and output the n transition detection signals;
    a data transition comparator configured to output the lowest data transition detection signal and the highest data transition detection signal based on the n transition detection signals; and
    a data selector configured to select one of the n pre-recovery signals in response to the highest data transition detection signal, and output the recovered input signal.

10. The data receiver circuit of claim 1, wherein the DFE adaptation control circuit comprises:
    a DFE adaptation controller configured to receive the lowest data transition detection signal and the highest data transition detection signal, and output an increase control signal and a decrease control signal configured to respectively increase and decrease control codes by 1; and a counter configured to receive the increase control signal and the decrease control signal, and output the DFE adaption control signal.

11. The data receiver circuit of claim 10, wherein the DFE adaptation controller is configured to compare a first highest data transition detection signal of a first clock cycle with a second highest data transition detection signal of a second clock cycle subsequent to the first clock cycle, and output the increase control signal when an interval included in the second highest data transition detection signal is changed from an interval included in the first highest data transition detection signal, and wherein the DFE adaptation controller is further configured to compare a first lowest data transition detection signal of the first clock cycle with a second lowest data transition detection signal of the second clock cycle, output the increase control signal or the decrease control signal for changing a first control code corresponding to the first clock cycle in the same direction as a direction in which a second control code corresponding to the second clock cycle is changed when the number of the lowest data transitions included in the first lowest data transition detection signal is decreased, and output the increase control signal or the decrease control signal for changing the first control code corresponding to the first clock cycle in an opposite direction to the direction in which the second control code corresponding to the second clock cycle is changed when the number of the lowest data transitions is increased.

12. The data receiver circuit of claim 10, wherein when the highest data transition detection signal maintains the same interval for a predetermined time, the DFE adaptation controller is configured to control the control code using the lowest data transition detection signal.

13. A data receiver circuit comprising:
n over-sampling circuits configured to receive n respective clock signals and an input signal, generate n respective sampling signals, and latch n respective equalizing signals generated in response to the n respective sampling signals and a decision feedback equalizer (DFE) control signal to output n respective pre-recovery signals, the n over-sampling circuits configured to receive as feedback the n respective pre-recovery signals, n being a natural number equal to or greater than 2;

a data recovery circuit configured to receive the n clock signals and the n pre-recovery signals and output a recovered input signal, a lowest data transition detection signal, and a highest data transition detection signal; and a DFE adaptation control circuit configured to generate the DFE control signal in a first mode using the highest data transition detection signal, and further generate the DFE control signal in a second mode using the lowest data transition detection signal, wherein the lowest data transition detection signal indicates an $X^{th}$ interval of one clock cycle, the $X^{th}$ interval corresponding to an interval determined to have a lowest number of transitions of the input signal, and wherein the highest data transition detection signal indicates a $Y^{th}$ interval of one clock cycle, the $Y^{th}$ interval corresponding to an interval determined to have a highest number of transitions of the input signal.

14. The data receiver circuit of claim 13, wherein the DFE adaption control circuit is configured to increase an equalization ability of the n over-sampling circuits until a first condition is determined in the first mode, and increase or decrease the equalization ability until a second condition is determined in the second mode after the first condition is determined.

15. The data receiver circuit of claim 14, wherein the first condition is a condition where an interval of the highest data transition detection signal is maintained for a predetermined time, and the second condition is a condition where the number of input signal transitions included in the lowest data transition detection signal increases or decreases.

16. A receiver circuit comprising:
n sampling receivers configured to sample an input signal and output n respective sampling signals in response to n respective clock signals each having n intervals within a clock cycle, n being a natural number equal to or greater than 2;

n decision feedback equalizer (DFE) circuits configured to equalize the n respective sampling signals in response to a DFE control signal and generate n respective pre-recovery signals in response to the n equalized sampling signals and n respective previous pre-recovery signals, the DFE control signal for changing an equalization ability of the n DFE circuits; and a data recovery circuit configured to select one of the n respective pre-recovery signals, and output the selected n pre-recovery signal as a recovered input signal, wherein the data recovery circuit is further configured to generate n transition detection signals each indicating at least one of the n intervals and the number of transitions of the input signal at the at least one of the n intervals, and output a highest data transition detection signal and a lowest data transition detection signal based on the n transition detection signals, wherein the lowest data transition detection signal indicates an $X^{th}$ interval of one clock cycle, the $X^{th}$ interval corresponding to an interval determined to have a lowest number of transitions of the input signal, and wherein the highest data transition detection signal indicates a $Y^{th}$ interval of one clock cycle, the $Y^{th}$ interval corresponding to an interval determined to have a highest number of transitions of the input signal.

17. The receiver circuit of claim 16, wherein the data recovery circuit is further configured to output the recovered input signal in response to the highest data transition detection signal.

18. The receiver circuit of claim 17, wherein a DFE control circuit is configured to output the DFE control signal in response to the highest data transition detection signal and the lowest transition detection signal.

19. The receiver circuit of claim 18, wherein each of the n intervals indicates a delay amount between two adjacent clock signals among the n clock signals.

* * * * *